United States Patent [19]

Blankenship

[11] Patent Number: 5,337,422
[45] Date of Patent: Aug. 16, 1994

[54] INCINERATOR TOILET WITH APPARATUS FOR CONTROLLING LID AND SPLIT BOWL

[75] Inventor: Ernest B. Blankenship, Dallas, Tex.

[73] Assignee: Research Products/Blankenship Corporation, Dallas, Tex.

[21] Appl. No.: 944,680

[22] Filed: Sep. 14, 1992

[51] Int. Cl.⁵ ............................................. A47K 11/02
[52] U.S. Cl. .................................................... 4/111.5
[58] Field of Search ............................... 4/111.1–111.6

[56] References Cited

U.S. PATENT DOCUMENTS

| | | |
|---|---|---|
| 3,020,559 | 2/1962 | Blankenship et al. |
| 3,169,497 | 2/1965 | Blankenship ........................ 4/111.2 |
| 3,890,653 | 6/1975 | Blankenship. |
| 3,943,579 | 3/1976 | Blankenship. |
| 4,823,408 | 4/1989 | Blankenship. |
| 4,905,324 | 3/1990 | Blankenship. |
| 5,123,122 | 6/1992 | Blankenship. |

*Primary Examiner*—Charles E. Phillips
*Attorney, Agent, or Firm*—Arthur F. Zobal

[57] ABSTRACT

The incinerator toilet has an incinerator chamber with a lid and a split bowl. Apparatus is provided for causing the lid to completely clear the chamber opening before the split bowl sections begin to open. This is accomplished by operatively connecting the rear bowl section with the front bowl section such that the rear bowl section moves only with the movement of the front bowl section. A cam mechanism is operatively coupled with the lid mechanism so that the lid clears the chamber opening before the cam allows the front bowl section to open.

9 Claims, 4 Drawing Sheets

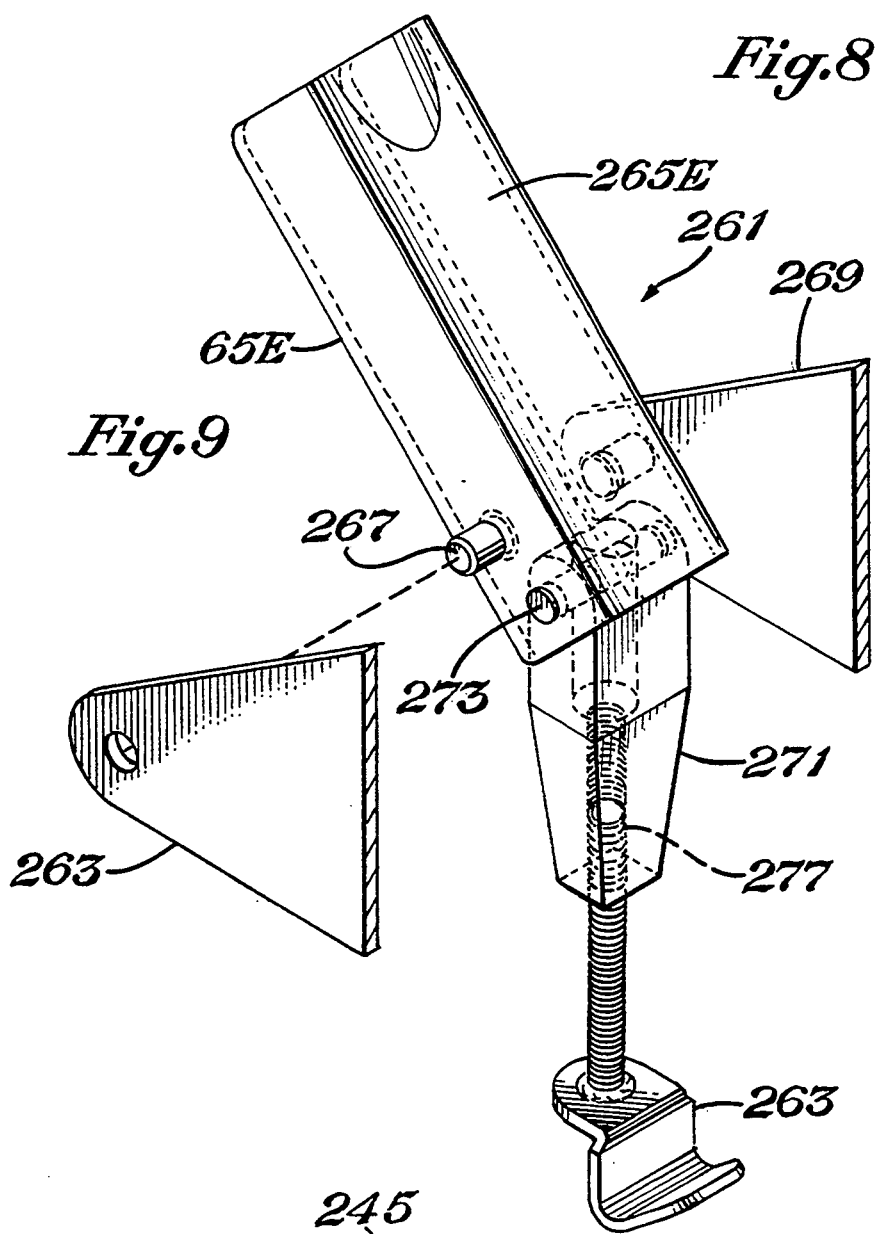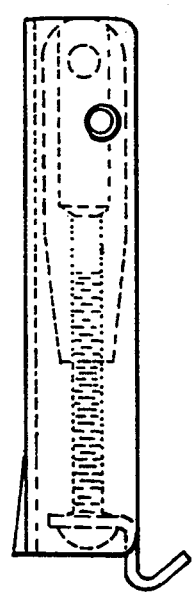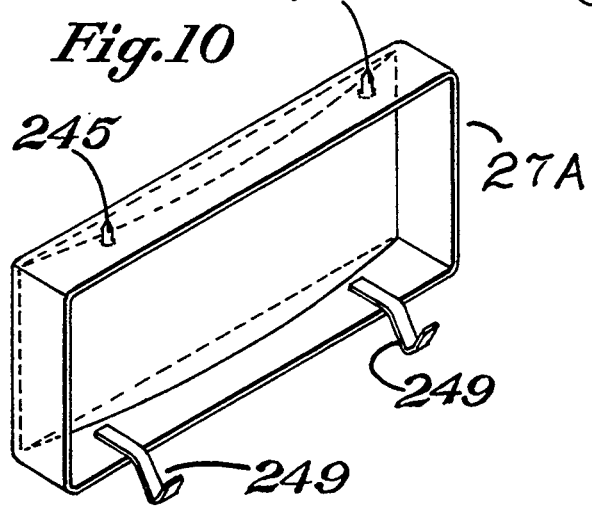

INCINERATOR TOILET WITH APPARATUS FOR CONTROLLING LID AND SPLIT BOWL

BACKGROUND OF THE INVENTION

1. Field of the Invention

The invention relates to an incinerator toilet with an incinerator chamber having a lid and a split bowl with a mechanism for opening and closing the lid and the bowl halves.

2. Description of the Prior Art

My U.S. Pat. Nos. 3,020,559; 3,890,653; 3,943,579; 4,823,408; 4,905,324; and 5,123,122 disclose incinerator toilets with an incinerator chamber having a lid and a split bowl with a mechanism for opening and closing the bowl halves.

The commercially available waterless incinerator toilet utilizes a disposable liner in the shape of the bowl in which to catch waste matter. This bowl of the toilet is made of two equally shaped halves which open essentially equally to form an opening of approximately 4 inches when fully extended.

The mechanism for opening the bowl halves and allowing the bowl liner and its contained waste to drop into the incinerator chamber is operatively connected to the incinerator lid which covers the opening of the incinerator chamber. The incinerator lid is caused to move and expose the opening to the chamber by means of a mechanism connected to the foot pedal.

In operation, the foot pedal is depressed, the lid lifts up about 1/2 inch then swings backwardly, the bowl halves open and the bowl liner and waste fall into the incinerator chamber where incineration takes place.

Heretofore, the travel of the lid and the opening of the bowl have been, more or less, linear in relationship, i.e., the bowl has begun to open as soon as the lid has begun to move with the result that the bowl halves have separated noticeably before the lid has cleared the opening to the incinerator chamber. Thus, a portion of the lid is visible through the partially opened bowl and the bowl is not fully opened until the lid is fully extended. The action can be speeded up by rapidly depressing the foot pedal and lid has mostly disappeared before bowl can react and open in a linear fashion. If the lid is opened at normal or lesser speed, the tip of the bowl liner and its contained waste can touch the top surface of the lid before the lid has cleared the opening.

During normal operation of the toilet, the lid becomes heated, attaining a temperature of about 500 degrees F on its top surface. If the bowl liner is made of paper, the bowl liner does not adhere to the top of the lid. If, however, the bowl liner is made of plastic material, e.g., polyethylene, the result of touching the heated lid surface can be catastrophic; the liner melts, sticks to the lid and the contained waste may be dropped outside of the incinerator chamber creating odorous and unsanitary conditions.

In the past, paper has been used exclusively as the bowl liner material as it can be hand-fabricated easily. There are disadvantages however; paper is relatively more expensive than other moisture impervious materials; paper creates an odor when burning; fabrication of the paper bowl liner by automation is difficult and expensive.

Plastic sheet material such as polyethylene can be fabricated more easily and cheaply by machine. This material also burns cleaner than paper and can be fabricated in rolls rather than in stacks. A plastic bowl liner can be used with the incinerator toilet only if the liner and contained waste can fall directly into the lower portion of the incinerator chamber without touching the heated lid. Thus, the heated lid must be clear of the incinerator chamber opening before the bowl halves begin to open so that the bowl liner cannot contact the lid at all.

SUMMARY OF THE INVENTION

It is an object of the invention to provide an incinerator toilet with an incinerator chamber having a lid and a split bowl comprising first and second bowl sections with an apparatus for causing the lid to completely clear the chamber opening before the split bowl sections begin to open. This is accomplished by operatively connecting the second bowl section with the first bowl section such that the second bowl section moves only and linearly with the movement of the first bowl section. A cam mechanism is operatively coupled with the lid mechanism so that the lid clears the chamber opening before the cam allows the first bowl section to open.

In a further aspect, actuating means is provided for initially raising the lid from the upper seat of the chamber and then moving the lid laterally of the upper end of the chamber to open the upper end of the chamber and to allow the two bowl sections to move to open positions for releasing the liner into the central opening of the chamber. Guide means is secured to the first bowl section for movement therewith. The guide means has a length sufficient to be located next to the second bowl section and beyond its closure side edges when the two bowl sections are located in their closed and open positions. Engaging means is secured to the second bowl section for engaging and moving on the guide means when the two bowl sections move to their closed and open positions.

In another aspect, means is coupled to the actuating means for preventing said first bowl section from moving to its open position until said lid is moved upward and laterally of the upper end of the chamber.

In a further aspect, an ash pan chamber is located below the incinerator chamber for receiving a removable ash pan. Means is provided for holding the top of the ash pan in the ash pan chamber against the lower end of the incinerator chamber and for releasing the ash pan for removal purposes.

BRIEF DESCRIPTION OF THE DRAWINGS

FIGS. 4 and 5 are not drawn to the same scale as that of FIG. 3.

FIG. 8 is a side view of the over-center latching mechanism of FIG. 7.

FIG. 9 is an exploded view of the over-center latching mechanism of FIG. 7.

FIG. 10 is an inside view of the removable front panel of the housing of the incinerator toilet.

DESCRIPTION OF THE PREFERRED EMBODIMENTS

Figure 1:
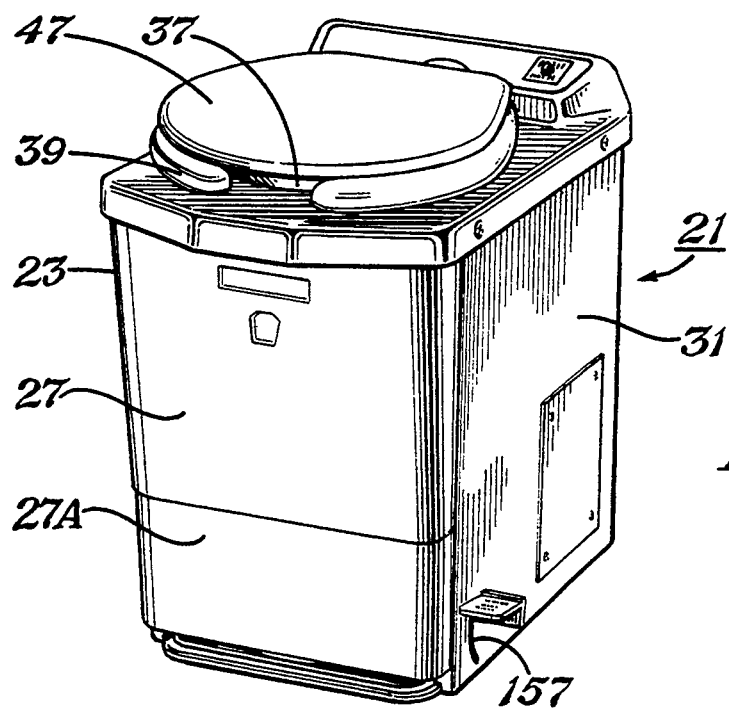
FIG. 1 is an isometric view of the front and a side of the incinerator toilet of the invention.
Figure 2:
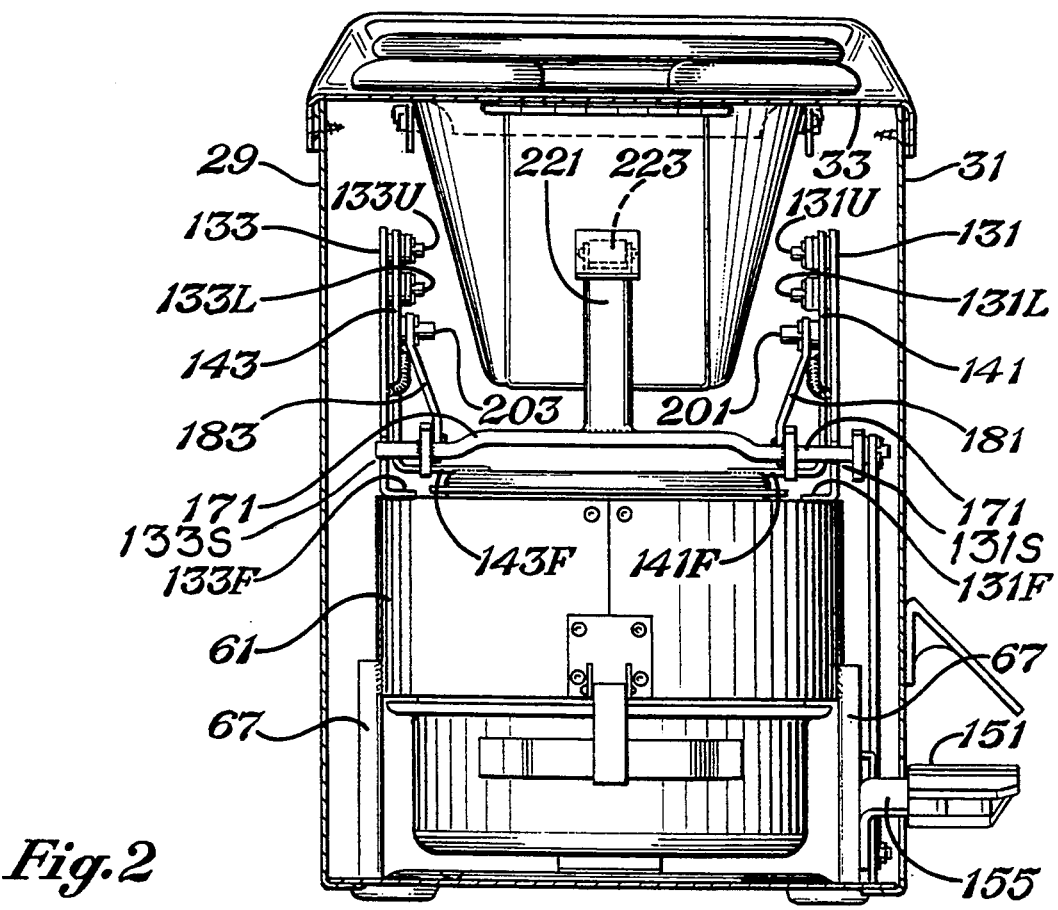
FIG. 2 is a cross-section of the toilet taken through the front end of the housing.

Referring now to the drawings, the incinerator toilet is identified by reference numeral 21. The toilet 21 comprises a housing 23 formed by a rear wall 25, a front wall 27 with a removable lower panel 27A, two side walls 29 and 31, a top wall 33, and a bottom wall 35 all of which are preferably formed of mild steel. The top wall 33 has an upper opening 37. A hinged seat 39 having a central opening is adapted to be located against the top of the wall 33 around the opening 37 as shown or moved to an upward position. A hinged lid 41 is adapted to fit over and against the top of the seat 39 as shown. The lid 41 also may be moved to an upward position independently of the seat. The seat 39 and lid 41 are hinged to the top wall 33 by way of a hinge arrangement illustrated at 43.

Figure 4:
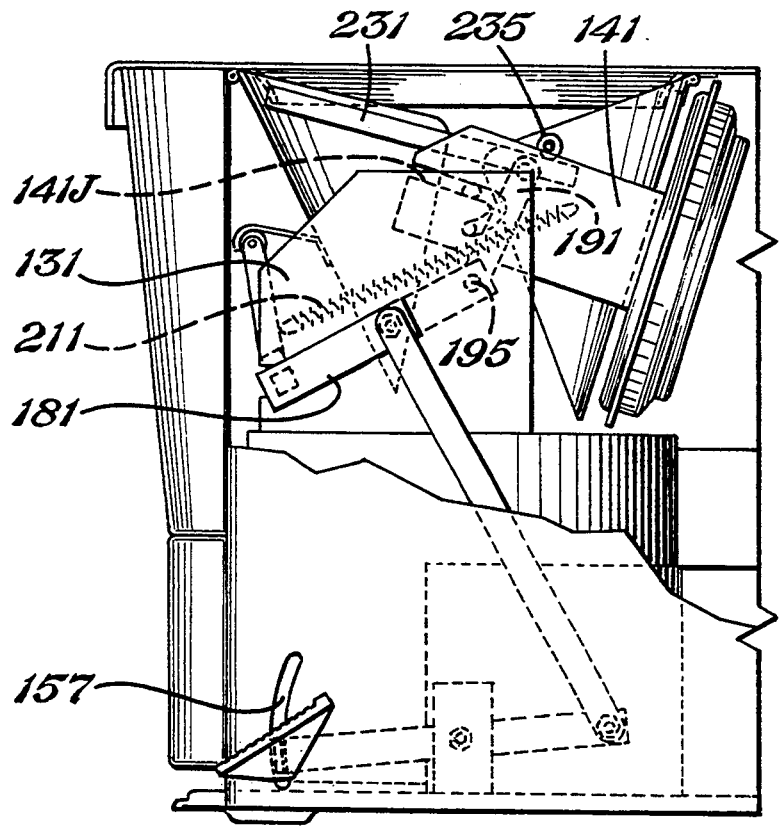
FIG. 4 is a cross-section of the toilet taken through the side of the housing showing the position of the apparatus for moving the chamber lid to its open position and the bowl sections in their open positions.
Figure 5:
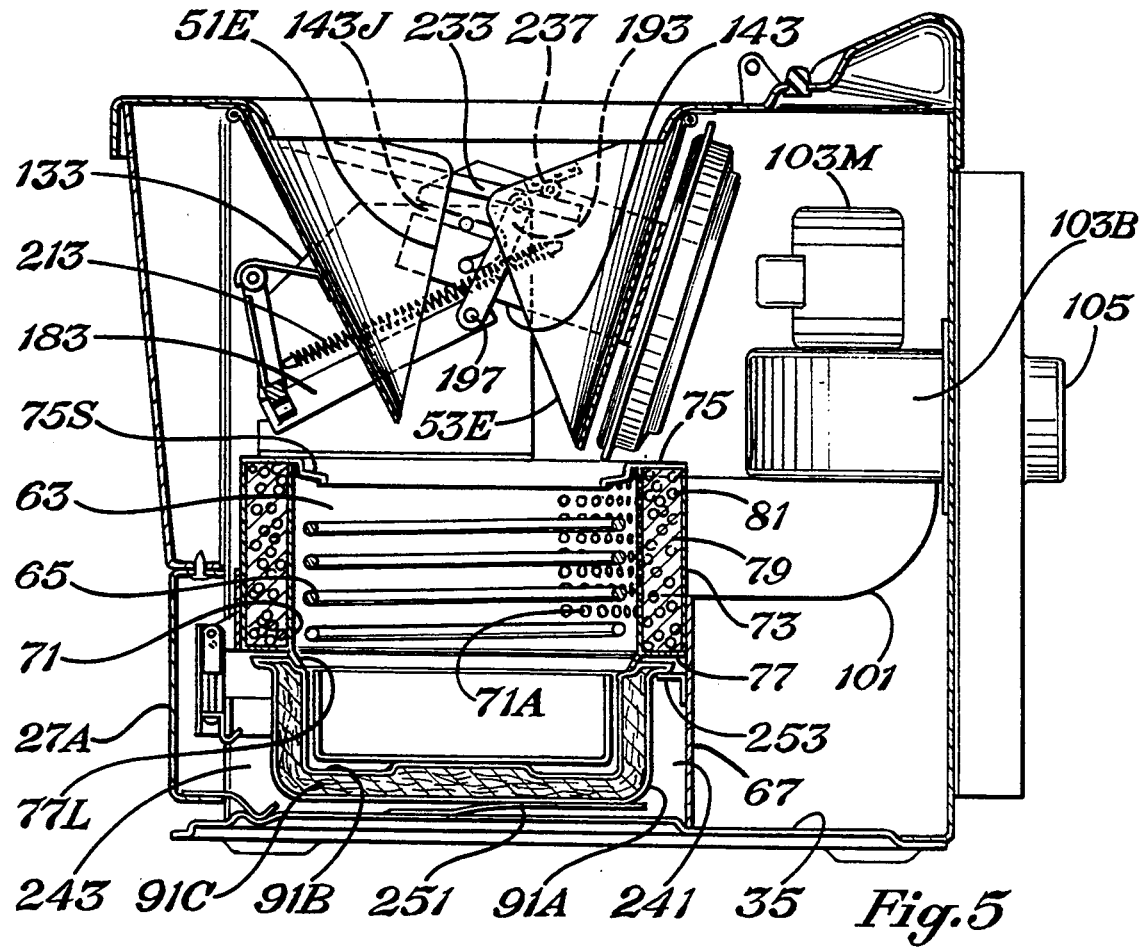
FIG. 5 is a view similar to that of FIG. 4 with part of the foot pedal linkages removed for purposes of clarity and showing cross sections of the incinerator chamber, the ash pan, and the bowl sections.
Figure 3:
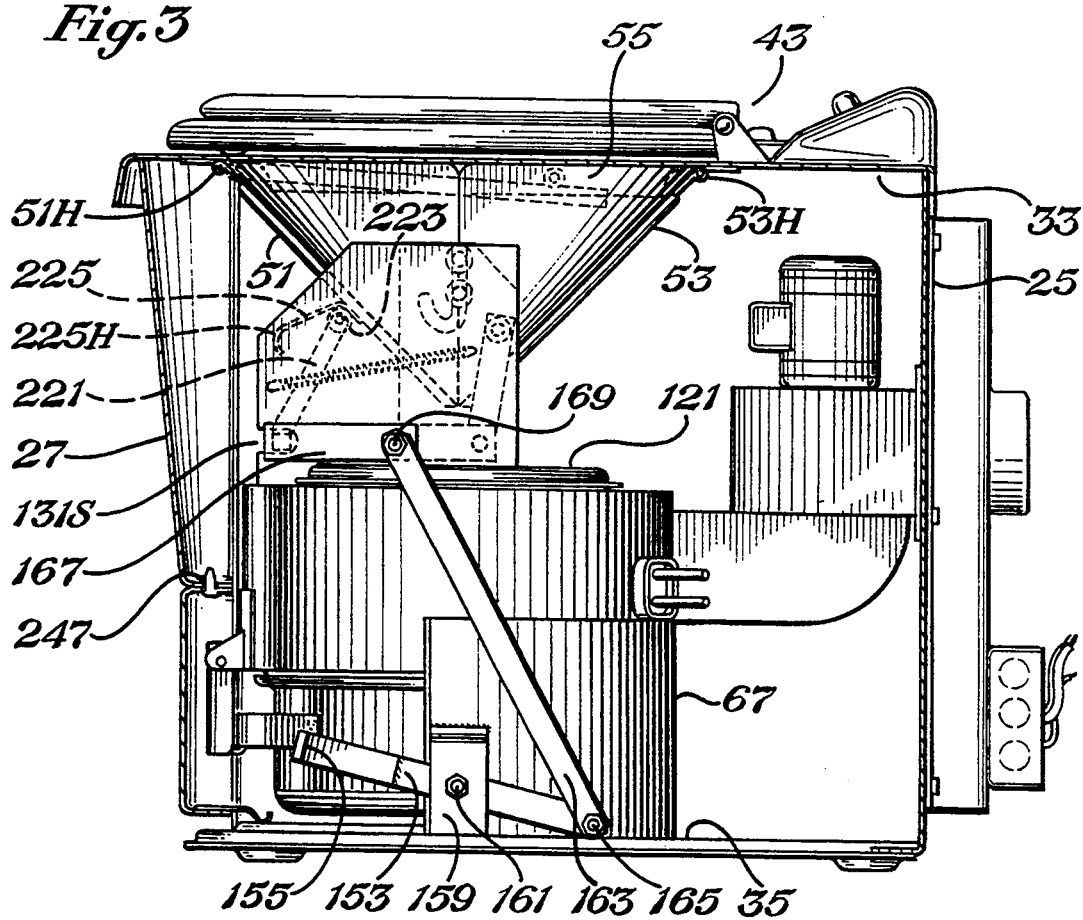
FIG. 3 is a cross-section of the toilet taken through the side of the housing with the split bowl halves shown in their closed positions.
Figure 6:
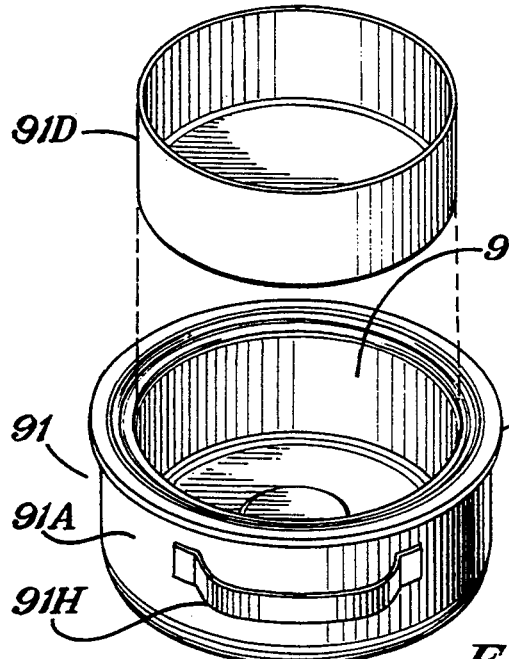
FIG. 6 is an exploded view of the ash pan used in the toilet.
Figure 7:
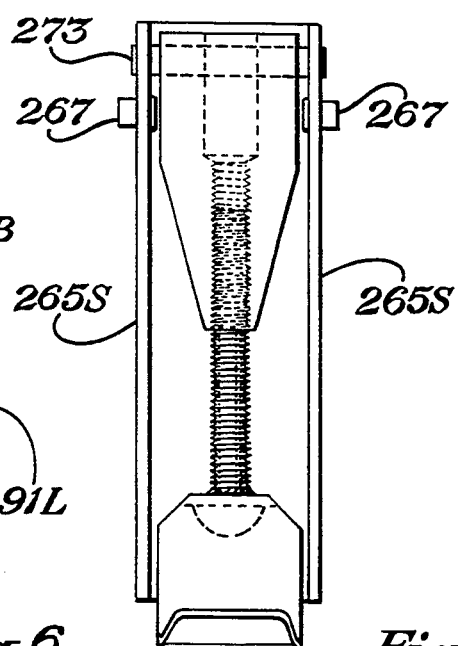
FIG. 7 is an inside view of the over-center latching mechanism for latching the ash pan in the ash pan receiving chamber.

Two bowl sections 51 and 53 of stainless steel are pivotally mounted to the underside of the top wall 33 by way of hinges 51H and 53H. The two bowl sections 51 and 53 have edges 51E and 53E which may be moved together to closed positions as shown in FIG. 3 to form a cone with an upper opening 55 for receiving and holding a cone shaped insert and to spaced apart open positions as shown in FIGS. 4 and 5 for releasing the cone shaped insert.

The incinerator toilet 21 comprises an incinerator chamber 61 having a central opening 63 with open upper and lower ends. A circular electrical heating coil 65 is located and supported in the opening 63. The chamber 61 is secured to a semi-circular metal support 67 mounted to the bottom wall 35 such that the chamber 61 is located below the bowl sections 51 and 53. The chamber 61 comprises annular inner and annular outer walls 71 and 73 secured together by upper and lower annular walls 75 and 77 forming an annular chamber 79 in which is located a heat activated catalyst 81 such as oxidized aluminum pellets for reducing odor.

A removable ash pan 91 is located in a chamber 241 formed below the incinerator chamber 61.

The chamber walls 71, 73, 75, and 77 are formed of stainless steel. Wall 71 has apertures 71A formed therethrough and wall 73 has apertures (not shown) formed therethrough in a given area. A rear vent 101 is connected to the chamber wall 75 around its apertures and a blower wheel in a housing 103B and a motor 103M are coupled to the vent 101 and to an exterior vent 105 for drawing gases from the interior 63 of the incinerator chamber by way of wall apertures 73A, the heat activated catalyst 81, the apertures of wall 75, vent 101, blower 103B and vent 105.

The upper wall 75 of the chamber 61 has an annular recessed seat 75S in which an incinerator chamber lid 121 is located for closing the upper end of the chamber 61 while the heater coil 65 is being energized for disposing of the waste received in the pan 91.

When the incinerator toilet is being used by a person, the bowl half sections 51 and 53 will be located in their closed positions as shown in FIG. 3 and a cone shaped insert located in the closed bowl sections 51 and 53. When it is desired to deposit the waste in the cone insert within the pan 91, the chamber lid 121 will be raised upward and out of the recessed seat 75S and then swung laterally to the side and out of the way to allow the bowl sections 51 and 53 to open to allow the cone insert to drop through the central opening 63 of the chamber 61 into the pan 91.

After the cone insert and waste have been deposited in the pan 91, the bowl sections 51 and 53 will be returned to their closed positions and the chamber lid 121 will be returned to its closed position on the seat 75S. A switch then is actuated to complete an electrical circuit to the coil 65 and to the blower motor. A timer mechanism causes the heater coil 65 and exhaust blower to come into operation, staying on until the incineration process and cooling process are completed. Gases from the chamber 61 are drawn through the heat activated catalyst for reducing odor and through the vent line 101, 103B, 105. Residual ash is collected in the ash pan 91. Reference is made to U.S. Pat. Nos. 3,020,559; 3,890,653; 3,943,579; 4,823,408; 4,905,324; and 5,123,122 for more detailed description of different types of incinerator chambers, ash pans, and venting systems which may be used and which patents are hereby incorporated into this application by reference.

There now will be described the apparatus of the invention for moving the incinerator seat 121 upward and laterally and for opening the bowl sections. Two outer plates 131 and 133 have flanges 131F and 133F secured to top wall 75 of the chamber 61 on opposite sides thereof. Two inner plates 141 and 143 have flanges 141F and 143F which are secured to the top of the lid 121 on opposite sides. Plates 141 and 143 are located inside of and next to plates 131 and 133 respectively. Plates 141 and 143 have J-shaped slots 141J and 143J formed therethrough from their upper ends. Secured to the upper end of plate 131 are upper and lower studs 131U and 131L which extend inward and fit in the slot 141J of plate 141. Secured to the upper end of plate 133 are upper and lower studs 133U and 133L which extend inward and fit in the slot 143J of plate 143. The slots 141J and 143J act as guides such that from the closed position of the lid 121, it can move upward with the studs in the straight portion of the slots and then laterally rearward to an open position as shown in FIGS. 4 and 5 with the upper studs in the straight portions of the slots and the lower studs in the curved portions of the J-shaped slots respectively. From the open position, the lid 121 can be moved to the closed position with the studs in the straight portions of the J-shaped slots.

The mechanism for moving the lid upward and laterally rearward and then back to the closed position comprises a foot operated petal 151 fixedly secured to one end of a linkage 153 by an extension member 155 which extends outward and moves in an arcuate slot 157 formed through the housing wall 31. The linkage 153 is pivotally coupled to a support 159 by way of a bolt 161. Support 159 is secured to the support 67 and to the bottom wall 35. The other end of the linkage 153 is pivotally coupled to one end of a linkage 163 by a bolt 165. The other end of the linkage 163 is pivotally coupled to one end of a side bar 167 by a bolt 169. The other end of the side bar 167 is fixedly secured to a transverse bar 171 which extends across the front portion of the toilet and which is supported in slots 131S and 133S formed in the front edges of plates 131 and 133 respectively. Fixedly secured to the ends of transverse bar 171 are two side bars 181 and 183 which extend rearward. The rear ends of side bars 181 and 183 are pivotally coupled to the ends of two linkages 191 and 193 by bolts 195 and 197 respectively. The other ends of linkages 191 and 193 are pivotally coupled to studs 201 and 203 respectively which are coupled to and extend inward from lid plates 141 and 143 respectively.

When the foot pedal 151 is depressed, the rear end of the linkage 153 is moved upward causing the upper end of linkage 163 to move upward and forward. This rotates the transverse bar 171 and bars 181 and 183 counterclockwise as seen in FIGS. 3–5 causing the lid plates 141 and 143 and hence the lid 121 to move upward and then laterally rearward due to the action of the plate studs 131U, 131L, and 133U and 133L in the J-slots 41J and 143J as described previously. Springs 211 and 213 are coupled between plates 131 and 141 and 133 and 143 respectively to pull the lid plates and hence the lid 121 back to the closed position when the foot pedal 151 is released.

Fixedly secured to the transverse rod 171 is a bowl control rod 221 which has a roller 223 at its free end. When the foot pedal, the linkage 163, transverse rod 171 and linkages 191 and 193 are in the normal positions as shown in FIG. 1, the control rod 221 is located such that its roller 223 engages the bottom side of the bowl section 51 and holds it in its closed position.

Secured to the bottom side of the bowl section 51 is a metal leaf spring 225 with a downward extending hook member 225H at its free end.

Secured to the bowl section 51 at its upper end on opposite sides thereof are two guide bars 231 and 233. The bars 231 and 233 extend downward at a small angle relative to the top edge of the bowl section 51 to a position past the edges 51E and 53E and next to the bowl section 53, when the bowl sections 51 and 53 are in their closed and open positions. Secured to opposite sides of the bowl section 53 are two rollers 235 and 237 which are located to roll on the top surfaces of bars 231 and 233 respectively.

When the bowl section 51 is in its closed position, the rollers 235 and 237 engaging the bars 231 and 233 hold the bowl section 53 in its closed position.

When the foot pedal 151 is depressed, and the transverse rod 171 rotates counterclockwise as shown in FIGS. 3–5, the roller 223 rides against the underside of the resilient spring 225 and keeps the bowl section 51 closed until the roller engages the inside of the hook portion 225H. As the transverse rod 171 continues to rotate counterclockwise, the roller 223, engaging the hook portion 225H, pulls the spring 225 and hence the bowl section 51 to its open position allowing the bowl section 53 to move by gravity to its open position with the rollers 235 and 237 rolling on the top surfaces of the bars 231 and 233.

Thus with the apparatus shown and described, the lid 121 is moved upward and laterally to the side before the bowl sections 51 and 53 are allowed to open whereby the liner insert is released from the bowl sections 51 and 53 only after the lid 121 has been moved to its completely open position.

Fixed metal studs coupled to opposite sides of the bowl section 53 could be used instead of the rollers 235 and 237 to perform the same function thereof. Instead of rolling, they would slide on the bars 231 and 233.

When the foot pedal 151 is released and the springs 211 and 213 pull the plates 141 and 143 and the lid 121 to the closed position, the rod 221 and roller 223 move clockwise as shown in FIGS. 3–5, with the roller 223 engaging the underside of the spring 225 and then the underside of the bowl section 51 to move it to its closed position. When this occurs, the rods 231 and 233 rotate counterclockwise as shown in FIGS. 3–5, moving the rollers 235 and 237 counterclockwise and causing the rollers 235 and 237 to roll towards the fixed ends of the bars 231 and 233 thereby moving the bowl section 53 to its closed position.

The ash pan 91 is similar to the ash pan of U.S. Patent No. 4,905,324 and comprises an outer pan formed by stainless steel members 91A and 91B secured together with heat insulation material 91C located therebetween and a removable aluminum pan 91D. The outer pan 91A, 91B has an outward extending upper edge or lip 91L. A U-shaped handle 91H is secured to pan member 91A.

An ash pan receiving chamber 241 is formed between the lower end of the incinerator chamber 61 and the bottom wall 35 of the housing 23 which extends from an inlet end 243 to the back of the support 67. A removable stainless steel panel 27A is provided for allowing access to the chamber 241 and hence the ash pan 91. The panel 27A has two studs 245 adapted to fit into two holes 247 formed in the underside of front wall 27 and two spring members 249 adapted to engage the bottom wall 35 of the housing to apply upward pressure to the panel 27A to hold the studs 245 in the holes 247 to hold the panel in place. To remove the panel 27A, its top end is moved downward against the pressure of the spring member 249 to remove the studs 245 from the holes 247, thereby allowing the panel 27A to be removed from the housing.

A spring 251 is secured to the bottom wall 35 of the housing at the back side of the chamber 241 and a bracket 253 is secured to the back side of the semi-circle support 67 such that when the ash pan 91 is inserted into the chamber 241, the spring 251 urges the pan 91 upward to allow the underside of its lip 91L to engage the upper side of the bracket 253 to aid in holding the pan 91 in the chamber 241 with the upper edge of the ash pan 91A, 91B sealed against the lower lip 77L of the chamber 61. This prevents gases from flowing out of the toilet by way of the ash pan chamber.

Also provided is an over center latch 261 secured to the housing 23 with a hook adapted to hook onto the bottom edge of the handle 91H for securing the pan 91 in place.

The latch 261 comprises a U-shaped member 265 having two side walls 265S and an end wall 265E with two studs 267 pivotally coupled to two tabs 269 which are secured to the housing 23. A hook support 271 is pivotally coupled to the two side walls 265S by a pin 273 near the top edge of the member 265. A threaded member 275 has one end fixedly secured to the hook 263 and the other end screwed into a threaded hole 277 to allow the distance between the hook 263 and the pin 273 to be adjusted.

In order to release the hook 263 from the handle 91H, the member 265 is pivoted upward to lower the hook 263. This allows the front end of the ash pan 91 to be lowered to facilitate removal of the pan from the ash pan chamber 241. In order to secured the hook to the handle 91H, the hook 263 is placed under the handle 91H and the member 265 rotated downward to raise the hook 263 against the bottom edge of the handle 91H.

The lid 121 preferably is formed of stainless steel enclosing a heat insulation material.

I claim:

1. An incinerator toilet comprising:

housing structure, an incinerator chamber located in said housing structure and having a central opening with an open upper end, a seat formed around said open upper end of said chamber, heating means located in said central opening of said chamber, a lid for engaging said seat for closing said upper end of said chamber and for opening said upper end of said chamber, a bowl located above said open upper end of said chamber and comprising first and second bowl sections each of which have side edges, means for pivotally coupling said first and second bowl sections to said housing structure to allow said first and second bowl section to move to closed positions with their side edges next to each other for holding a liner and to open positions with their side edges located away from each other for releasing the liner into said central opening of said chamber, means for initially raising said lid from said seat and then moving said lid laterally of said upper end of said chamber to open said upper end of said chamber and to allow said first and second bowl sections to move to said open position for releasing the liner into said central opening of said chamber, guide means secured to said first bowl section for movement therewith, said guide means having a length sufficient to be located next to said second bowl section and beyond its side edges when said first and second bowl sections are located in said closed or open positions, and engaging means secured to said second bowl section for engaging and moving on said guide means when said first and second bowl sections move to said closed and open positions.

2. The incinerator toilet of claim 1 wherein said means for initially raising said lid from said seat and then moving said lid laterally of said upper end of said chamber comprises:

first and second outer plate means secured to said upper end of said chamber on opposite sides thereof, first and second inner plate means secured to the top of said lid between said first and second outer plate means respectfully, said bowl means comprising a front end formed by said first bowl section and a rear end formed by said second bowl section with said side edges of said first and second bowl sections being located between said first and second inner plate means respectfully, means for moveably securing said first and second inner plate means to said first and second outer plate means respectfully to allow said first and second inner plate means and hence said lid to move initially upwardly and then laterally of said upper end of said chamber, shaft means rotatably mounted below said front end of said bowl means for rotatable movement between first and second positions, cam means secured to said shaft means for holding said first bowl section in its closed position with said engaging means engaging said guide means to hold said second bowl section in its closed position, first and second linkages pivotally coupled to opposite ends of said shaft means and to said first and second inner plate means respectfully, and control means for moving said shaft means from said first position to said second position to cause said first and second linkages to move said first and second inner plate means and hence said lid upward and laterally of said upper end of said chamber and for causing said cam means to hold said first bowl section in its closed position until said lid is moved upward and laterally of said upper end of said chamber and then to move said first bowl section to its open position, said guide means and said engaging means holding said second bowl section in its closed position when said first bowl section is in its closed position and allowing said second bowl section to move to its open position when said first bowl section is in its open position, said control means being adapted to move said shaft means from said second position to said first position to cause said cam means to move said first bowl section to its closed position causing said guide means and said engaging means to move said second bowl section to its closed position and to cause said first and second linkages to move said first and second inner plate means and hence said lid to move laterally and then downwardly to said seat of said open upper end of said chamber.

3. The incinerator toilet of claim 2, comprising:

spring means extending from the lower end of said first bowl section, said cam means being positioned to engage said spring means as said shaft means is moved between its first and second positions for holding said first bowl section closed until said lid is moved upward and laterally of said upper end of said chamber.

4. The incinerator toilet of claim 2 wherein said control means comprises a bar having one end fixedly connected to said shaft means and a movable linkage pivotally coupled to the other end of said bar for rotating said bar and hence said shaft means between said first and second positions.

5. The incinerator toilet of claim 1, comprising:

said housing structure has a lower end and said chamber has an open lower end, support means for supporting said lower end of said chamber above said lower end of said housing structure forming a pan receiving chamber between said lower ends of said housing structure and said chamber, a removable ash pan adapted to be located in said pan receiving chamber below said incineration chamber and in line with said central opening of said incinerator chamber, said ash pan having a closed bottom and an upper open end with an outward extending upper edge, a bracket secured to said support means and located in said pan receiving chamber, and spring means secured to the bottom of said housing structure and located in said pan receiving chamber such that when said ash pan is located in said pan receiving chamber said spring means engages the bottom of said ash pan and urges said pan upward with a lower surface of said outward extending upper edge of said ash pan engaging an upper surface of said bracket means and the upper edge of said ash pan engaging the lower end of said incinerator chamber.

6. The incinerator toilet of claim 5, comprising:

said pan receiving chamber having an inlet end, a handle secured to said ash pan and adapted to be located near said inlet end of said pan receiving chamber when said ash pan is located within said pan receiving chamber, and an over center hook pivotally coupled to said housing structure above said pan receiving chamber near said inlet end for securely engaging said handle when said as pan is located in said pan receiving chamber.

7. The incinerator toilet of claim 1, wherein:

said first and second bowl portions each have an upper portion, said guide means comprises at least one elongated guide bar secured to the outside of said upper portion of said first bowl section and having a length sufficient to be located next to and one the outside of said upper portion of said second bowl portion and beyond its side edge when said first and second bowl sections are located in said closed or open positions, said engaging means is secured to the outside of said upper portion of said second bowl portion for engaging and moving on said guide bar when said first and second bowl sections move to said closed and open positions.

8. An incinerator toilet comprising:

housing structure, an incinerator chamber located in said housing structure and having a central opening with an open upper end, a seat formed around said open upper end of said chamber, heating means located in said central opening of said chamber, a lid for engaging said seat for closing said upper end of said chamber and for opening said upper end of said chamber, a bowl located above said open upper end of said chamber, said housing structure having a lower end and said chamber having an open lower end, support means for supporting said lower end of said chamber above said lower end of said housing structure forming a pan receiving chamber between said lower ends of said housing structure and said chamber, a removable ash pan adapted to be located in said pan receiving chamber below said incinerator chamber and in line with said central opening of said incinerator chamber, said ash pan having a closed bottom and an upper open end with an outward extending upper edge, a bracket secured to said support means and located in said pan receiving chamber, and spring means secured to the bottom of said housing structure and located in said pan receiving chamber such that when said ash pan is located in said pan receiving chamber said spring means engages the bottom of said ash pan and urges said pan upward with a lower surface of said outward extending upper edge of said ash pan engaging an upper surface of said bracket means and the upper edge of said ash pan engaging the lower end of said incinerator chamber.

9. The incinerator toilet of claim 8, comprising:

said pan receiving chamber having an inlet end, a handle secured to said ash pan and adapted to be located near said inlet end of said pan receiving chamber when said ash pan is located within said pan receiving chamber, and an over center hook pivotally coupled to said housing structure above said pan receiving chamber at said inlet end for securely engaging said handle when said ash pan is located in said pan receiving chamber.

* * * * *